United States Patent
Katmor et al.

(10) Patent No.: US 10,334,083 B2
(45) Date of Patent: Jun. 25, 2019

(54) SYSTEMS AND METHODS FOR MALICIOUS CODE DETECTION

(71) Applicant: enSilo Ltd., Herzlia (IL)

(72) Inventors: Roy Katmor, Herzlia (IL); Tomer Bitton, Herzlia (IL); Udi Yavo, Herzlia (IL); Ido Kelson, Herzlia (IL)

(73) Assignee: enSilo Ltd., Herzliya (IL)

( * ) Notice: Subject to any disclaimer, the term of this patent is extended or adjusted under 35 U.S.C. 154(b) by 230 days.

(21) Appl. No.: 14/949,913

(22) Filed: Nov. 24, 2015

(65) Prior Publication Data
US 2016/0149937 A1    May 26, 2016

Related U.S. Application Data

(60) Provisional application No. 62/147,040, filed on Apr. 14, 2015, provisional application No. 62/083,985, filed on Nov. 25, 2014.

(51) Int. Cl.
*H04L 29/06* (2006.01)

(52) U.S. Cl.
CPC ........ *H04L 69/161* (2013.01); *H04L 63/0236* (2013.01); *H04L 63/0263* (2013.01);
(Continued)

(58) Field of Classification Search
CPC ............... H04L 63/1416; H04L 69/161; H04L 63/1441; H04L 63/0281; H04L 29/06;
(Continued)

(56) References Cited

U.S. PATENT DOCUMENTS 7,287,281 B1    10/2007 Szor
7,793,346 B1    9/2010 Daub
(Continued)

FOREIGN PATENT DOCUMENTS

JP    2005151492    6/2005
JP    2010-509654    3/2010
(Continued)

OTHER PUBLICATIONS

International Search Report and the Written Opinion dated Mar. 2, 2016 From the International Searching Authority Re. Application No. PCT/IL2015/051136.
(Continued)

*Primary Examiner* — Ashokkumar B Patel
*Assistant Examiner* — Quazi Farooqui

(57) ABSTRACT

There is provided a computer implemented method for detection and prevention of an attempt at establishment of a network connection for malicious communication, comprising: detecting a connection establishment process for establishing a network connection, the connection establishment process initiated by code running on a client terminal; analyzing records in at least one stack trace of the initiating code managed at the client terminal, to detect a trial to establish a malicious communication wherein the network connection is used for malicious activity; and blocking establishment of the network connection when the analysis detects the trial to establish the malicious communication based on the network connection.

31 Claims, 8 Drawing Sheets

(52) U.S. Cl.
CPC ...... *H04L 63/1416* (2013.01); *H04L 63/0281* (2013.01); *H04L 63/1441* (2013.01)

(58) Field of Classification Search
CPC ............. H04L 63/0263; H04L 63/0236; G06F 21/577; G06F 21/20; G06F 21/554; G06F 21/57; G06F 21/55; G06F 21/10
USPC ............................ 726/23, 2, 22, 25; 713/187
See application file for complete search history.

(56) References Cited

U.S. PATENT DOCUMENTS

| | | | |
|---|---|---|---|
| 8,032,940 B1* | 10/2011 | Dhanani | G06F 21/6218 713/191 |
| 8,893,278 B1 | 11/2014 | Chechik | |
| 9,355,247 B1* | 5/2016 | Thioux | G06F 21/55 |
| 2009/0172102 A1* | 7/2009 | Chesnutt | H04L 51/12 709/206 |
| 2010/0293618 A1 | 11/2010 | Medvedev et al. | |
| 2011/0271343 A1* | 11/2011 | Kim | G06F 21/566 726/23 |
| 2012/0030731 A1 | 2/2012 | Bhargava et al. | |
| 2013/0275981 A1 | 10/2013 | Dalcher | |
| 2014/0068326 A1 | 3/2014 | Quinn | |
| 2014/0082739 A1 | 3/2014 | Chess et al. | |
| 2014/0310811 A1 | 10/2014 | Hentunen | |
| 2016/0149887 A1 | 5/2016 | Katmor et al. | |

FOREIGN PATENT DOCUMENTS

| | | |
|---|---|---|
| JP | 2010-079906 | 4/2010 |
| JP | 2013-532869 | 8/2013 |
| WO | WO 02/061510 | 8/2002 |
| WO | WO 2008/056944 | 5/2008 |
| WO | WO 2016/084073 | 6/2016 |
| WO | WO 2016/084076 | 6/2016 |

OTHER PUBLICATIONS

International Search Report and the Written Opinion dated Mar. 2, 2016 From the International Searching Authority Re. Application No. PCT/IL2015/051139.
Rao et al. "Measurement and Analysis of TCP Connection Establishment Phase of Web Server", Asian Journal of Computer Science and Information Technology, 1(2): 41-44, 2011.
Roundy et al. "Hybrid Analysis and Control of Malware", Proceedings of the 13th International Conference on Recent Advances in Intrusion Detection, RAID 2010, Ottawa, Ontario, Canada, Sep. 15-17, 2010, 6307: 317-338, Sep. 2010.
Official Action dated Jul. 28, 2017 From the US Patent and Trademark Office Re. U.S. Appl. No. 14/949,918. (23 pages).
International Preliminary Report on Patentability dated Jun. 8, 2017 From the International Bureau of WIPO Re. Application No. PCT/IL2015/051136.
International Preliminary Report on Patentability dated Jun. 8, 2017 From the International Bureau of WIPO Re. Application No. PCT/IL2015/051139. (10 Pages).
Notice of Reasons for Rejection dated Dec. 26, 2017 From the Japan Patent Office Re. Application No. 2017-546274 and Its Translation Into English. (3 Pages).
Notice of Eligibility for Grant, Search Report and Examination Report dated Nov. 16, 2017 From the Intellectual Property Office of Singapore, IPOS Re. Application No. 11201704059R. (9 Pages).
Office Action dated Nov. 27, 2017 From the Israel Patent Office Re. Application No. 252500 and Its Translation Into English. (4 Pages).
Written Opinion dated Nov. 15, 2017 From the Intellectual Property Office of Singapore, IPOS Re. Application No. 11201704060R. (7 Pages).

* cited by examiner

SYSTEMS AND METHODS FOR MALICIOUS CODE DETECTION

RELATED APPLICATIONS

This application claims the benefit of priority under 35 USC 119(e) of U.S. Provisional Patent Application Nos. 62/083,985, filed on Nov. 25, 2014 and 62/147,040, filed on Apr. 14, 2015. The contents of all of the above applications are incorporated by reference as if fully set forth herein in their entirety.

BACKGROUND

The present invention, in some embodiments thereof, relates to systems and methods for malicious connection detection and, more specifically, but not exclusively, to systems and methods for detection of malicious code that utilizes network connections for malicious activity and/or communication.

Certain types of malicious code attack computers and use the host computer to connect to other servers through a network connection. In one example, the network connection is initiated by the malicious code itself, for example, to send stolen data to a remote server. In another example, the malware injects code to a legitimate application, the injected code then initiates a connection to a remote server to send stolen data.

One example of a type of malicious attack is an advanced targeted attack (ATA), which is a sophisticated attack in which an unauthorized party gains access to a network and stays undetected for a long period of time. The intention of most ATAs is to steal data rather than cause damage to the network. ATAs target organizations in sectors with high-value information, such as credit card processors, government agencies, and the financial services industry.

Examples of Anti-ATA solutions are based on detection of the attack or detection of the infiltrated malicious code. In another example, other tools are designed to detect abnormal or malicious activity in action.

SUMMARY

According to an aspect of some embodiments of the present invention there is provided a computer implemented method for detection and prevention of an attempt at establishment of a network connection for malicious communication, comprising: detecting a connection establishment process for establishing a network connection, the connection establishment process initiated by code running on a client terminal; analyzing records in at least one stack trace of the initiating code managed at the client terminal, to detect a trial to establish a malicious communication wherein the network connection is used for malicious activity; and blocking establishment of the network connection when the analysis detects the trial to establish the malicious communication based on the network connection.

Optionally, analyzing records comprises analyzing flow-data including the at least one stack trace and at least one member of the group consisting of: thread data, module data, and process data related to the connection establishment.

Optionally, the method further comprises gathering, at each respective client, data related to the at least one stack trace and/or flow-data; and transmitting, from each respective client to a central server, the data related to the at least one stack trace; wherein the analyzing is performed by the central server. Optionally, data related to the at least one stack trace includes dynamic code.

Optionally, the method further comprises permitting the connection establishment process to activate the network connection when the trial to establish the malicious communication based on the network connection is not detected.

Optionally, the analysis is performed prior to activation of the network connection.

Optionally, the analysis is performed prior to malicious activity and/or communication related data forwarding by the initiating application when the network connection is activated.

Optionally, the at least one stack trace is collected during the connection establishment executed according to a transmission control protocol (TCP) of the internet protocol suite for initiation of the connection establishment process.

Optionally, the method further comprises halting the connection establishment process after the detecting.

Optionally, the at least one stack trace and/or flow-data is obtained at the initiation of the connection establishment process.

Optionally, the at least one stack trace includes at least one sequence of multiple stack traces obtained at multiple points during the connection establishment process, and said analyzing comprises matching the multiple stack traces to flow-data analysis representing the trial to establish the malicious communication.

Optionally, analyzing comprises analyzing the records of the at least one stack trace for at least one of an unknown module and a blacklisted or whitelisted module, representing infection of the initiating application.

Optionally, analyzing comprises analyzing the at least one stack trace for connection establishment flow-data analysis used by uninfected applications designated as valid at a central server performing the analysis.

Optionally, analyzing comprises comparison of at least one stack trace with connection establishment stack flow-data analysis expected to be generated by the application when the application has not been infected with injected code that initiates the trial to establish the malicious activity/communication.

According to an aspect of some embodiments of the present invention there is provided a system for detection of an attempt at establishment of a network connection for malicious communication, comprising: at least one gateway configured to: receive at least one stack trace of a code running on a client terminal during a connection establishment process for establishing a network connection with a network based server; analyze records in the at least one stack trace to determine a presence or absence of a trial to establish a malicious communication wherein the network connection is used for malicious activity; detect an attempt at establishing the network connection for the malicious communication when the records are matched to malicious flow-data analysis; and generate a signal representing the trial to establish the malicious communication using the network connection.

Optionally, receive comprises receive at least one flow-data and analyze records comprises analyze the flow-data including the at least one stack trace and at least one member of the group consisting of: thread data, module data, and process data related to the connection establishment.

Optionally, the at least one gateway resides at a remote server communicating with the client terminal over a network.

Optionally, the at least one gateway is a software module residing at the client terminal.

Optionally, the at least one gateway is a proxy server.

Optionally, the system further comprises an endpoint module for installation at the client terminal, configured to detect an initiation of establishment of the network connection by the code; transmit the at least one stack trace and/or flow-data to the gateway; receive the signal from the gateway; and block the connection establishment process to prevent activation of the network connection based on the received signal.

Optionally, the at least one gateway is further configured to prevent activation of the network connection based on the received signal.

Optionally, the system further comprises a management server in communication with the at least one gateway, the management server configured to collect the signal generated by the at least one gateway for each network connection request related to each client. Optionally, the management server further includes a user interface configured to allow a user to perform at least one member of the group consisting of: review the generated signals, manage the generated signals, centrally control the configuration of the at least one gateway, centrally control the configuration of at least one client terminal communicating with the at least one gateway, monitor status of the at least one gateway, and monitor status of at least one client terminal communicating with the at least one gateway.

Optionally, the application running on the client terminal is a web browser.

Optionally, the connection establishment process is managed by an application programming interface that represents a local end point for the network connection.

Optionally, the application running on the client terminal is part of a hypervisor.

Optionally, the application running on the client terminal is an unauthorized malicious application.

Optionally, the system further comprises updating the at least one gateway with a stack flow-data analysis associated with the identified attempt at establishing the network connection for the malicious communication, to identify similar stack flow-data analysis from other client terminals.

Optionally, the at least one gateway is further configured to receive at least one stack trace of the application when the network connection is active; and analyze records in the at least one stack trace to monitor for post connection establishment malicious activity using the active network connection.

Optionally, the at least one gateway is further configured to receive a plurality of at least one flow-data from each of a plurality of clients; and analyze the plurality of at least one flow-data to detect a coordinated attack.

According to an aspect of some embodiments of the present invention there is provided a computer program product for detection of an attempt at establishment of a network connection for malicious activity, the computer program product comprising: one or more non-transitory computer-readable storage mediums, and program instructions stored on at least one of the one or more storage mediums, the program instructions comprising: program instructions for detecting a connection establishment process for establishing a network connection, the connection establishment process initiated by code running on a client terminal; program instructions for analyzing records in at least one stack trace of the initiating code managed at the client terminal, to detect a trial to establish a malicious communication wherein the network connection is used for malicious activity; and program instructions for blocking establishment of the network connection when the analysis detects the trial to establish the malicious communication based on the network connection.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
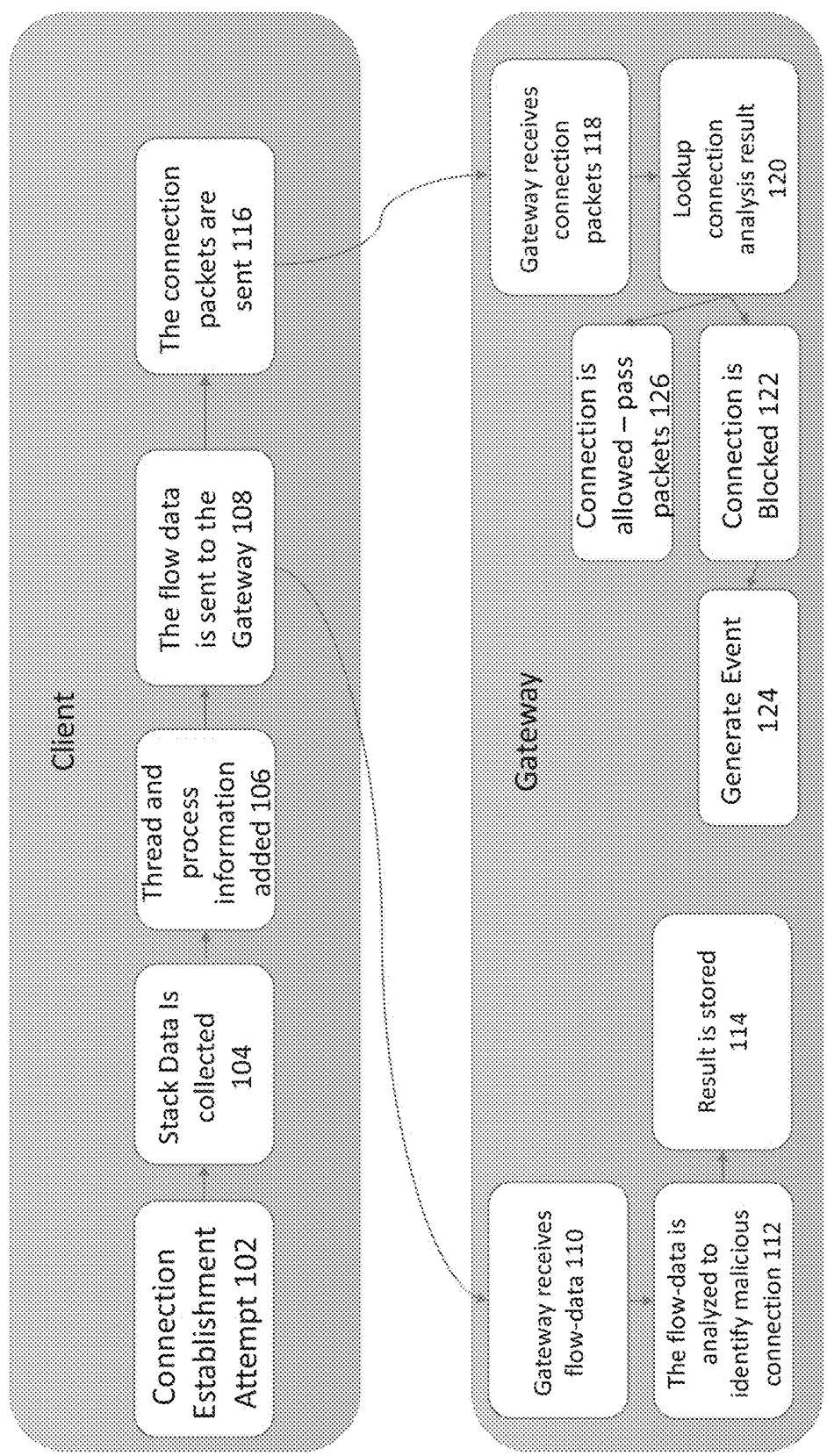
FIG. 1A is a computer implemented method for detection of malicious activity of a network connection where prevention occurs at the gateway, in accordance with some embodiments of the present invention.

The present invention, in some embodiments thereof, relates to systems and methods for malicious connection detection and prevention and, more specifically, but not exclusively, to systems and methods for detection of malicious code that utilizes network connection for a malicious activity and/or communication.

An aspect of some embodiments of the present invention relates to systems and/or methods for detection of an attempt at establishing a network connection for a malicious activity/communication. Connection establishments at the client terminal are monitored at a central gateway, based on each of multiple connected clients transmitting data representative of one or more local call stacks and optional operating system data related to the connection establishment process to the gateway server for analysis. The connection establishment call stack optionally enriched by one or more of: related process, modules analysis data, dynamically generated code and/or threads interaction at the client terminal are monitored and/or analyzed to identify malicious code. As described herein, the term flow-data means the described data collected at the client terminal, which includes the call stack data and optionally one or more of process data, module analysis data, and/or thread data.

Upon identifying of malicious activity related to the connection establishment process, the connection establishment process is halted and/or terminated. The network connection is prevented from being established. Data transmission over the network connection between the remote server and the local malicious agent is prevented. In this manner, malicious data transmission over the network is stopped before the malicious agent is able to use the network connection to cause damage, for example, to steal data from the remote server, or transmit stolen data from the local client to the remote server. In cases where the active network connection has been established, the network connection is monitored for the appearance of malicious activity. The active connection may be shut down or blocked when malicious activity is identified.

An application infected with malicious code, or the malicious code application itself may initiate the establishment of the network connection, for example, through an interface program (e.g., socket) of the operating system. The connection establishment activity for the malicious communication is identified prior to the finalized set-up of the network connection providing data transmission to and/or from the local application. The flow-data related to the initiating application may be analyzed upon detection of the establishment request, establishment initiation and/or during the connection establishment process itself, for example, before and/or during the multi-step handshake process of the transmission control protocol (TCP) of the internet protocol (IP) suite.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As defined herein, the term connection establishment means the computerized processes that occur before a certain application is able to transmit and/or receive data over a network connection. The connection establishment process may be managed and/or executed by an application programming interface receiving initiation commands from the certain application to establish the connection, to receive data from the certain application to transmit over the established connection, and/or to transmit data to the certain application received over the established connection.

Figure 2:
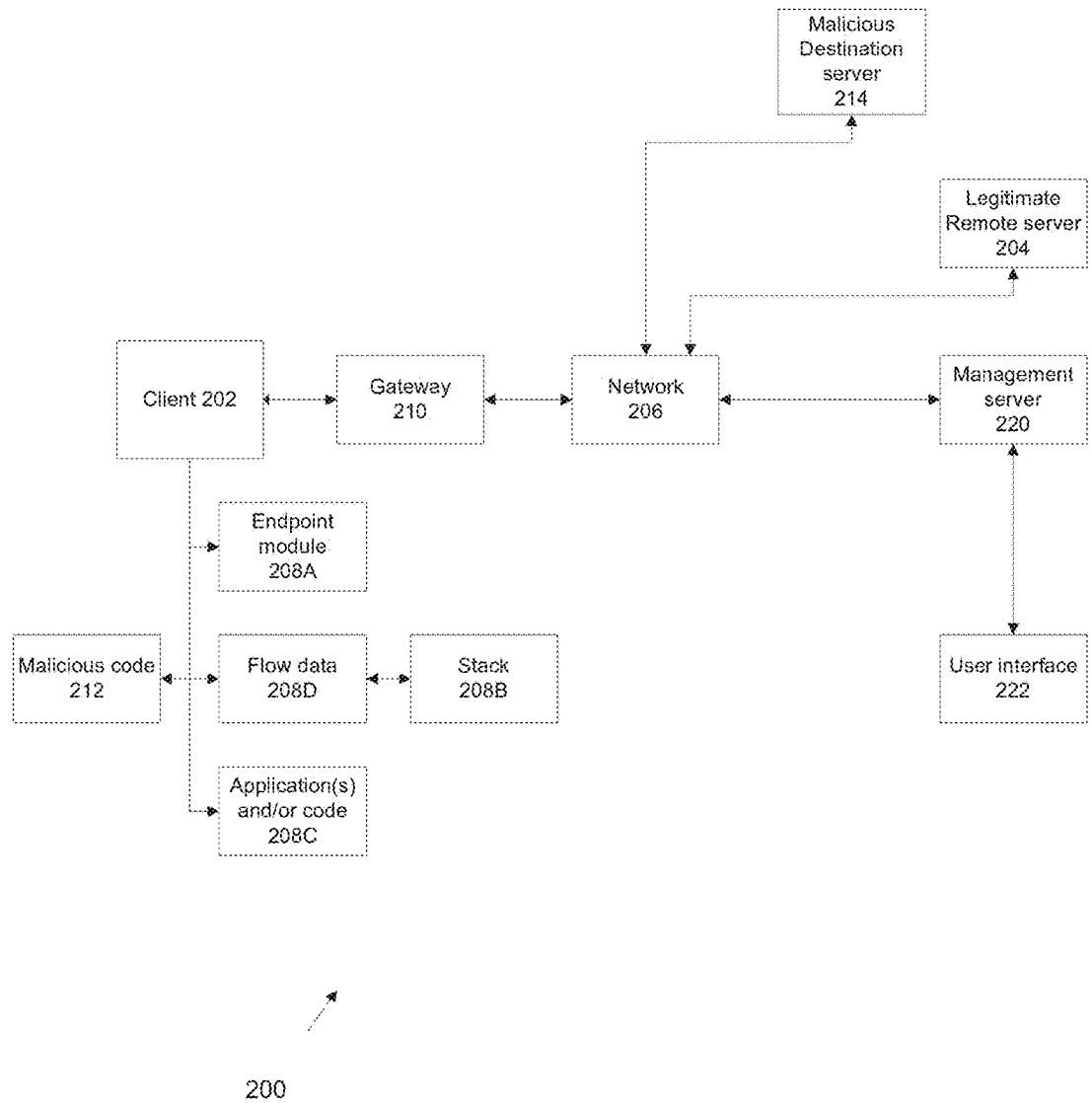
FIG. 2 is a block diagram of a system for detection and blocking of malicious activity of a network connection, in accordance with some embodiments of the present invention.

Reference is now made to FIG. 1A, which is a flowchart of a computer implemented method for detection of a network connection for a malicious activity and/or communication where prevention occurs at the gateway, in accordance with some embodiments of the present invention. Reference is also made to FIG. 2, which is a system for detection and prevention of a network connection for a malicious communication, in accordance with some embodiments of the present invention. The system described with reference to FIG. 2 may execute the method described with reference to FIG. 1A. The systems and/or methods detect an attempt at establishing the network connection for a malicious activity and/or communication associated with a malicious agent, and halt and/or prematurely terminate the connection establishment process before the malicious agent is able to utilize the network connection for malicious activity based on data transmission and/or reception. In this manner, remote commands executed by the malicious agent over the network connection are prevented. For example, theft of data (e.g., banking details, credit card numbers, financial details, military intelligence, confidential information, and sensitive information) by transmission of the data over the network connection under control of the malicious agent is prevented. In another example, modification and/or deletion of data at the remote computer through the network connection by the malicious agent is prevented. In yet another example, the malicious agent is unable to access a remote server to obtain additional instructions.

When a computer (e.g., client and/or server) is infected with the malicious agent, the systems and/or methods prevent the malicious agent from performing malicious activity over the network connection. The systems and/or methods provide an additional level of security, where a computer already infected with undetected and/or unknown malicious agent is prevented from causing damage to other remote computers and/or to the local computer itself, based on activity using the network connection.

The systems and/or methods may detect malicious agents running with the privilege of the operating system that may bypass security measures to establish network connections, for example, Hypervisor malicious code. Such malicious agents may attempt to establish connections without using operating system functions and/or by disabling and/or bypassing the endpoint-module. These attempts are blocked by the gateway as the connection establishment requests, monitored by the gateway are not be enriched and/or signed by the endpoint-modules.

Detection of the attempt to set up the network connection associated with the malicious agent allows for identification of malicious agents and/or malicious activity that would otherwise be difficult to identify, and/or that would otherwise be identified after damage has already occurred. For example, certain malicious agents are difficult or cannot be detected when idle, but only detected when active. In such a case, the systems and/or methods detect the malicious activity as part of the connection establishment process, before damage has been done over the network connection.

The systems and/or methods may identify attempts at establishing network connections for a malicious activity and/or communication based on unauthorized code execution (i.e., in which an attacker takes control over an application to execute malicious code) before damage occurs through the network connection. Such unauthorized code execution may be otherwise difficult to detect before damage has been done.

The attempt at establishing the network connection for a malicious activity and/or communication may be detected and halted without necessarily identifying the certain infecting malicious code agent. In this manner, unknown malicious agents may be prevented from accessing the network connection to perform malicious activity.

Optionally, the systems and/or methods for detection of the connection for a malicious activity and/or communication are installed, for example, within system 200.

System 200 includes at least one client 202, for example, a laptop, a desktop, a mobile device (e.g., Smartphone, tablet), and/or a server. Client 202 is an endpoint client capable of initiating a new network connection for data transmission from client 202 and/or to client 202. Endpoint client 202 may be a server.

Client 202 includes network connection capabilities, for example, a network interface, transmitter, and/or receiver. Client 202 may communicate with a remote server 204 through one or more network(s) 206, for example, a wireless network, a wired network, a cellular network, internet, a private network, and combinations of multiple networks thereof.

Optionally, an endpoint module 208A is installed on a memory of (or in communication with) one or more clients 202 (e.g., pre-installed, integrated with an operating system running on the client, and/or downloaded from a remote server or local memory and locally installed). Optionally, endpoint module 208A contains program instructions for execution by a processor of client 202, and for monitoring connection establishment related activity on client 202, as described herein. Alternatively or additionally, module 208A performs functions as directed by a gateway 210, for example, to halt the connection establishment, and/or to allow the connection establishment.

Gateway 210 receives connection establishment related data from client 202, analyze the data, and identify the attempt at establishment of the network connection for a malicious activity and/or communication, as described herein. Optionally, gateway 210 is a proxy server acting as an intermediary between a certain application on client 202 initiating the establishment of the network connection and an interface controlling the establishment of the network connection. Gateway 210 halts the connection establishment or allows the connection establishment to continue, by direct control and/or generation of an alert signal indicative of the status of the connection establishment.

Gateway 210 may be a software module for installation on a computer, and/or hardware equipment for communication with other computers. Alternatively or additionally, gateway 210 is installed to receive data from multiple clients 202. Gateway 210 may be installed within network 206, communicating with client(s) 202 over network 206, for example, gateway 210 may be a remote server, a locally installed server for communication with a pre-defined group of clients 202 such as within a private organizational network, at the interface between client(s) 202 and network 206 (e.g., network interface device), and/or installed within network 206 itself, for example, within an internal and/or boundary network device (e.g., layer 2 device, layer 3 device, router, gateway, and bridge).

One or more malicious agents 212 infect client 202. It is noted that the infection of the client may occur before the installation.

Malicious agent 212 may contain program instructions to establish a connection over network 206 to a remote malicious destination server 214, and/or to utilize a connection over network 206 between client 202 and a remote legitimate server 204.

One example of malicious agent 212 is dynamically linked library injection. Dynamically linked library injection is a technique used for running code within the address space of another process, for example, by forcing the process to load and execute dynamically linked library. Dynamically linked library injection may be used by external programs to influence the behavior of another program in a way the authors of the program did not anticipate or intend. Hackers may take advantage of the dynamically linked library injection technique and inject infected payload into endpoint applications in order to maliciously maneuver the original application. For example, Zeus is a malicious agent in the form of a Trojan horse that uses dynamically linked library injection into an internet browser application to hijack finance organization destined network connections in order to steal customer information and/or money. Zeus works by hooking HTTP handling functions to monitor and manipulate the network connections and data accessed by the web browser.

Another example of malicious agent 212 is bypass detection. Certain malicious code is programmed to run with the privilege of the operating system and/or higher level programs, for example, Hypervisor malicious code. Such malicious code bypasses security measures easily and establishes network connections at will.

Yet another example of malicious agent 212 is unauthorized code execution. Unauthorized code execution occurs when an attacker uses malicious action to control a program's code execution in order to execute his/her own malicious code. The malicious code is executed as a malicious code application running in the background of the affected endpoint client, allowing the hacker to maliciously maneuver the client.

Other examples of malicious agents 212 include viruses, worms, Trojan horses, spyware, and adware. Malicious agent 212 may be installed as executable code, a script, an application, and other software.

Figure 1B:
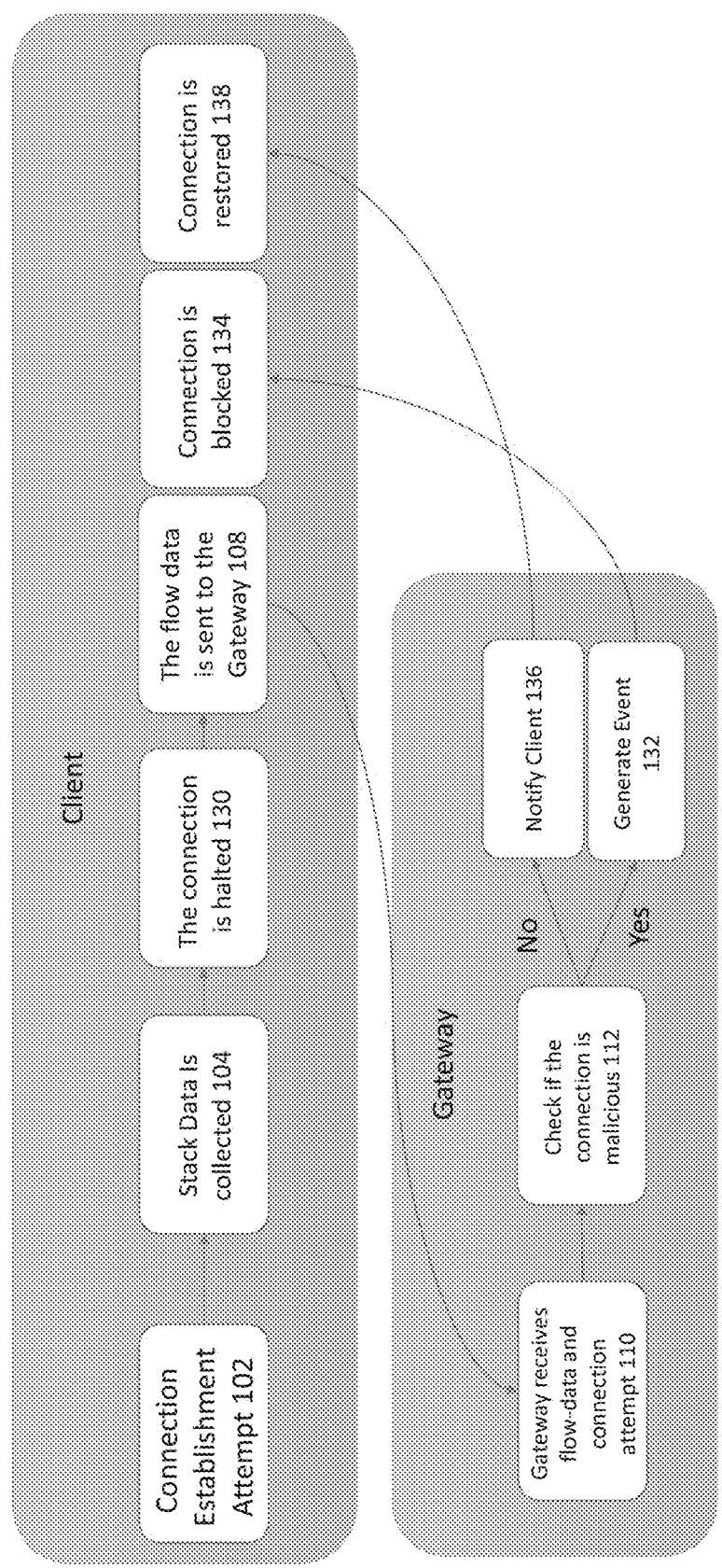
FIG. 1B is a computer implemented method for detection of malicious activity of a network connection where prevention occurs at the client, in accordance with some embodiments of the present invention.

With reference to FIGS. 1A and 1B, blocks occurring at the client may occur in client 202 of FIG. 2, and block occurring within the gateway may occur in gateway 210 of FIG. 2.

At 102, a connection establishment attempt is detected. Optionally, an initiation comment (e.g., a request) to establish a network connection by an application running on a client terminal to a network based server is detected. The application may be infected with malicious code 212, as described herein.

Optionally, the application and/or client is monitored to detect the attempt at establishing the network connection. For example, endpoint module 208A monitors client 202 to detect an attempt by application and/or code 208C (installed on client 202 and/or in communication with client 202) to establish a connection over network 206.

Optionally, the network connection is attempted to be established as a new connection. Alternatively, the network connection is attempted to be a re-establishment of a prior connection that was deactivated and/or suspended.

The application may attempt to establish the network connection to a trusted source, for example, remote legitimate server 204 (e.g., from which data is stolen), and/or may attempt to establish the network connection to a malicious source, for example, malicious destination server 214 (e.g., to which stolen data is transmitted to, and/or which acts as a remote malicious controller).

Examples of maliciously infected applications and/or malicious code 208C attempting to establish network connections include: web browsers, instant messaging application, word processing applications, image editing applications, music applications, update module(s) installed within an application, the operating system itself, remote computer control applications, and data synchronization applications. Infected application and/or malicious code 208C may be part of a hypervisor or virtual machine monitor that creates and/or runs virtual machines, for example, as described herein. Client 202 may include a virtual machine host. Infected application and/or malicious code 208C may be part of an unauthorized malicious application, for example, as described herein. Infected applications and/or malicious code 208C may be part of the application programming interface managing the connection establishment, for example, the socket.

Optionally, the initiation message (e.g., request) and/or the connection establishment are detected at the client end, for example, by endpoint module 208A. The request may be detected in association with the operating system at the client based on received notification of attempts at connection establishment, for example, based on the application issuing a command to an application programming interface that represents the local end-point for communication at the client, for example, a network socket such as an internet socket. The command may be to create a new network socket, and/or a signal after creation of the new network socket. In another example, the request may be detected based on the application issuing a command to a previously created socket. Detection at the client end prevents the malicious agent from establishing connections with servers outside of the client.

Optionally, the network establishment process is based on a parameter negotiating process with the remote server, for example, a handshaking process, for example, based on the TCP. Alternatively or additionally, the network establishment process is not based on the negotiating process, for example, a connectionless network connection, for example, based on the user datagram protocol (UDP).

At 104, stack data is collected, for example, as described below with reference to FIG. 4.

Optionally, at 106, additional flow-data 208D is obtained during the command to initiate establishment of the network connection, such as flow-data related to threads, processes, and/or modules, for example, as described below with reference to FIGS. 5A, 5B, and 5C.

At 108, the flow-data, including data of call stack 208B related to the connection establishment process (of block 104), and optionally including the addition flow-data (of block 106), is transmitted to gateway 210, for example, by endpoint module 208A which may access the stack data and/or other flow-data within client 202.

At 110, the gateway receives the flow-data transmitted by the client. The data transmission may occur over a network.

At 112, the data is analyzed to detect an attempt at establishing a connection for a malicious activity and/or communication. The data may include records in the flow-data representing process, threads, modules and dynamic code being executed at the client terminal.

The records are analyzed to detect the presence or absence of a trial to establish a malicious activity and/or communication, in which the network connection is used for malicious activity, for example, to steal data.

The trial to establish the malicious communication may be identified by detecting the attempt at establishing the network connection for the malicious activity and/or communication when the records represent illegal flow-data.

The analysis may be performed by gateway 210 analyzing the stack data to detect an attempt at establishing the connection for a malicious activity and/or communication, and generate a signal representing the presence or absence of the malicious communication.

Optionally, the stack trace is obtained from a call stack related to the application attempting to establish the network connection. The stack trace includes patterns and/or snapshot(s) of sequences of modules in the call stack related to the connection establishment. For example, the stack trace includes the modules within the call stack at the time the trace is obtained. The modules may be derived based on representations within the call stack, for example, pointers within the call stack pointing to the modules.

One or multiple stack traces may be obtained at one or multiple points in time during the request, initiation of the connection establishment process, and/or during the connection establishment process. The multiple stack traces captured at multiple points during the connection establishment process are selected to capture changes in the stack occurring during the request and/or connection establishment process.

The analysis is performed prior to data communication between the application and the remote server or malicious server, such as forwarding of data over the network by the initiating application. Optionally, the analysis is performed prior to establishment of the network connection. Alternatively or additionally, the analysis is performed prior to activation of the network session. In this manner, the validity of the connection establishment process may be determined before the malicious agent is able to act through the network connection, for example, prior to transmission of unauthorized data (i.e., stealing of data).

When an application running on the client is infected (e.g., based on injected code) and attempts to establish the external connection based on the infecting code, the connection establishment stack calls are different than stack calls of the same application when un-infected.

The analysis is performed based on the malicious application attempting to establish the network connection causing the call stack related to the connection establishment process to a flow-data analysis that is different than the call stack flow-data analysis when the malicious application is absent.

The analysis is performed based on one method or multiple methods, in parallel or sequentially. The analysis is performed by gateway 210, based on messages received from client 202 that include connection establishment related stack 208B data and/or flow-data 208D, as described herein. The analysis is performed prior to and/or during the connection establishment process, before data transmission by application 208C over the network, as described herein. Some examples of analysis methods include:

- Matching and/or correlating stack traces to flow-data analysis representing the trial to establish the malicious connection.
- Comparing and/or correlating modules within the stack against a pre-defined white list of validated modules, to identify unknown modules not located within the white list. The unknown modules are suspected as being a malicious infection of the initiating application. The validated modules may be designated as valid, for example, manually by an administrator, downloaded from a malicious code prevention server, and/or based on machine learning from uninfected applications.
- Comparing and/or correlating modules within the stack against a pre-defined black list of known malicious modules, to identify malicious module within the stack.
- Comparing and/or correlating the flow-data analysis of modules within the stack trace against validated connection establishment flow-data analysis, such as similar or equivalent known safe patterns. The flow-data analysis of modules may include the order of modules within the stack and/or changes occurring within the stack.
- Identifying unique events documented in the trace associated with malicious activity.
- Comparing and/or correlating the stack data against connection establishment stack flow-data analysis expected to be generated by the application when the application has not been infected. For example, infected with injected code that attempts to establish the connection for a malicious activity and/or communication using the application.

Verifying that modules in the stack were not loaded by code of an unknown module. Association with the unknown module suggests malicious code.

Verifying the calling thread or other threads in the process were not created by code of unknown module. Association with the unknown module suggests malicious code.

Verifying the process executable file format. Invalid formats may be associated with malicious code.

Multiple clients may be monitored together. Monitoring data from multiple gateways may be analyzed together. Stack data collected from the multiple clients at the gateway and/or data from multiple gateways may be analyzed together to identify a pattern of malicious activity, for example, malware infection spreading from client to client, and/or establishment of a coordinated attack from multiple clients establishing network connections to a single target server and/or to multiple target servers within a short period of time.

The comparison may be performed based on direct comparison to similar patterns. The correlation may be performed to identify a statistically significant correlation association with malicious activity, and/or a statistically significant association with validated safe activity.

The comparison and/or correlation may be performed, for example, by a function, or by a classifier trained to accept the stack trace(s) flow-data analysis(s) as input and output a signal indicative of the presence of malicious behavior or the absence of malicious behavior.

Figure 3A:
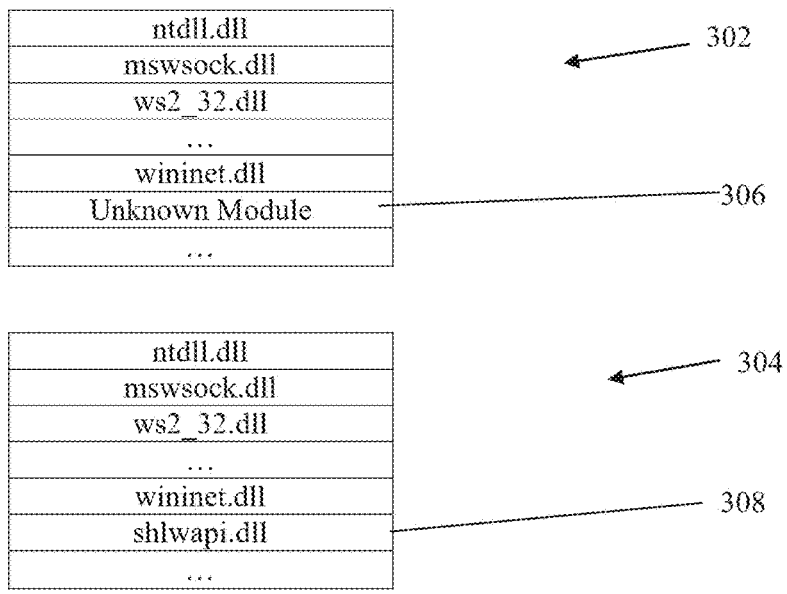
FIGS. 3A-3B are examples of call stacks, in accordance with some embodiments of the present invention.
Figure 3B:
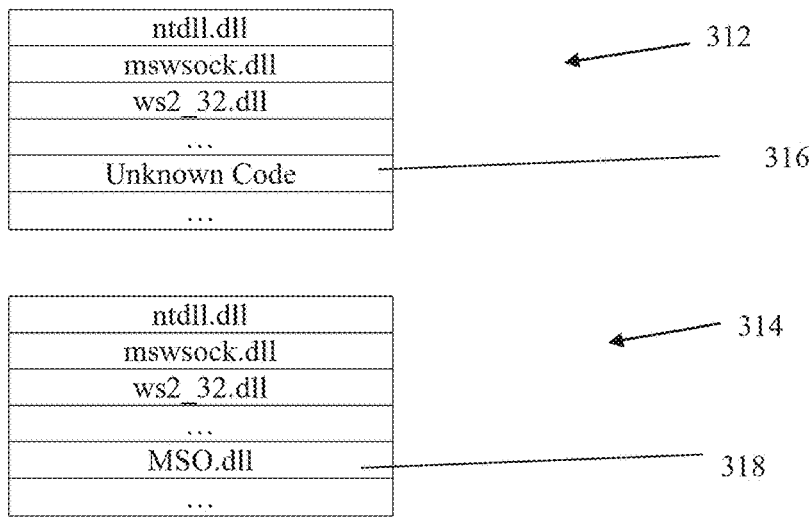

Reference is now made to FIGS. 3A-3B, which are examples of call stacks related to the connection establishment process in accordance with some embodiments of the present invention. For clarity, the figures depict a partial trace.

FIG. 3A depicts a call stack 302 of an infected web browser attempting to establish a connection, for example, to connect to a financial and/or bank website. Call stack 302 is analyzed, by comparison against call stack 304 which represents a validated connection establishment related stack expected for an uninfected web browser. The analysis detects that a certain file 308 (i.e., shlwapi.dll) is missing, and a code pointer to an unknown module 306 is present. Based on the flow-data analysis, malicious code is suspected.

FIG. 3B depicts a call stack 312 of an infected word processing program that is attempting to establish a network connection to connect to an attacker using unauthorized code execution. Stack 312 contains unknown code 316. In comparison, call stack 314 is the call stack of the word processing program during the attempt to establish the network connection when the word processing program is un-infected. Call stack 314 contains a pointer to a module 318 (i.e., MSO.dll) not present in infected call stack 316.

At block 114, the result of the analysis is stored on a memory within or connected to the gateway.

At 116, data related to the network connection attempt is transmitted from the client to the gateway over the network. Optionally, block 102 is completed and the network connection is activated to allow data transmission. Data (e.g., network message, such as packets) is transmitted over the active network from the client to the gateway. Initially, packets related to the communication establishment protocol are transmitted, for example, based on the TCP handshake process. Optionally, data packets are subsequently and/or sequentially transmitted over the connection.

At 118, the data transmitted in relation to the network connection attempt, and/or data transmitted over the activated network is received at the gateway.

At 120, the stored results of block 114 are accessed, to determine whether the received data (e.g., packets) are associated with malicious activity or whether the received data has been validated as allowed.

Optionally, at 122, when the attempt at establishment of the malicious communication is detected, the connection establishment process is blocked by the gateway at the gateway itself. Establishment of the network connection for a malicious activity and/or communication is prevented. The network connection may be prevented from activation, such as when handshaking packets are identified as related to malicious activity. Alternatively or additionally, the active network connection is monitored for malicious activity, and blocked when malicious activity is detected. For example, when the network connection is based on a connection-less protocol that does not require a handshake process, such as the user datagram protocol (UDP), all (or a selected subset of) packets sent may be monitored, or at least the first or several packets per sending thread.

Termination may be performed by gateway 210 by preventing packets related to the connection establishment process from being delivered and/or by issuing messages to terminate the connection establishment. The network connection may be blocked, or the network connection may be terminated.

Optionally, at 124, an alert is generated indicative of the detection of the attempt at establishment of the malicious communication. The alert may be presented to the user (e.g., displayed on a display connected to client 202) and/or to an administrator (e.g., displayed on a display connected to gateway 222, or a $3^{rd}$ party event management platform). The user may take further action, for example, acknowledge the malicious communication, and optionally run an anti-malicious code program to remove the infecting agent from the client. Alternatively or additionally, the alert message is formatted to be received by other anti-malicious code products which may triggers removal of the malicious code.

Alternatively, at 126, when the connection establishment is not identified as being malicious, and/or is validated as safe, the connection establishment process is permitted to continue to establish the network connection, activate the network connection, and/or continue to allow data transmission over the activated network. Endpoint module 208A and/or gateway 210 may generate signals to permit the connection establishment. When the connection establishment has been halted to allow the analysis to proceed, endpoint module 208A and/or gateway 210 may resume the connection establishment.

Optionally, one or more blocks 104-126 are repeated to monitor the activated network connection. Optionally, the stack and/or other flow-data is monitored after establishment of the network connection for malicious activity. Optionally, the stack is monitored by the client sending the stack data to the gateway.

The stack may be monitored, for example, continuously, during predefined periods of time, and/or during selected events (e.g., changes in the configuration of the network connection).

The network connection may be monitored (e.g., by the gateway) for suspicious malicious behavior. Upon detection of the suspicious behavior, the management may issue a command to the client to transmit the additional information for analysis. For example, the memory dump of the infected process.

The stack data may be recorded at the client, for example, continuously while the network connection is up. The recording of the stack may be transmitted to the gateway for analysis, periodically.

Optionally, the data related to the connection establishment monitoring is collected and/or analyzed. Data includes, for example, the call stack traces, signals and/or messages representing the presence or absence of the malicious communication for each network connection establishment attempt, and/or generated alerts. Data may be transmitted from endpoint module 208A and/or gateway 210 to a management server 220.

Data related to the post connection establishment monitoring of blocks 116-126 may be collected and/or analyzed by gateway 210 and transmitted to management server 220 for analysis.

Management server 220 is in communication (e.g., through network 206) with one or multiple gateways 210 and/or clients 202. Management server 220 may aggregate the data from the multiple gateways and/or clients, to provide, for example, an overall analysis. Alternatively or additionally, management server 220 may collect data for a single user of a single client, for example, to provide an analysis for the certain client.

Optionally, management server 220 includes a user interface module 222 that allows a user to perform one or more functions. Users may access user interface 222, for example, through a web browser over a network connection. Data may be viewed and/or analyzed centrally for multiple clients and/or gateways, or per client and/or gateway.

Management server 220 and/or user interface 222 perform one more of the following functions:
  Review the generated signals by the gateway: alerts indicating malicious communication attempts and/or messages indicating no malicious communication attempts.
  Manage the generated signals: spot trends and take action, for example, identify spread of a malicious agent between clients, stop a newly detected malicious agent, quarantine a highly infected client.
  Centrally control the configuration of the gateway(s): for example, update the gateway with new stack flow-data analysis indicating malicious agents, update the gateway with new stack flow-data analysis indicting validated and safe behavior, and match gateways to clients.
  Centrally control the configuration of the client(s): for example, update the clients with updated endpoint modules, match client to gateway, and enable transmission of stack data to the gateway.
  Monitor status of the gateway(s): for example, view number of alerts, pattern of similar alerts, client associated with the alerts, and percent malicious communications out of total connections.
  Monitor status of the client(s): for example, number of connection attempts, number of alerts of malicious communications, percent of malicious communications, suspected infected applications, and view flow-data analysis of similar malicious attempts.

Optionally, gateways 210 and/or endpoint modules 208A are updated based on the analysis, for example, by update messages transmitted by server 220, gateway 210 and/or module 208A. The local gateway and/or endpoint modules involved with the connection establishment may be updated. Other gateways and/or endpoint modules of clients (e.g., remotely located) not involved in the analyzed connection establishment process may be updated. The update may allow for identification of future similar malicious communication establishment patterns, for example, the same infected application repeatedly attempting to establish malicious communications, a different application infected by the malicious agent, and/or previously uninfected client that became infected by a similar malicious agent.

Reference is now made to FIG. 1B, which is a computer implemented method for detection of malicious activity of a network connection where prevention occurs at the client, in accordance with some embodiments of the present invention. For clarity and brevity, description of blocks already described with reference to FIG. 1A is omitted. New blocks and/or new features are described.

It is noted that FIG. 1A may be implemented, for example, within a private network architecture, such as a network within an organization, for example, a company. Clients within the organizational network trying to access external servers for malicious activity are commonly blocked at the gateway.

Detection of connection establishment for malicious communication that is performed outside of the client, within the network and/or at the server end (i.e., by the gateway), may centrally identify and prevent a coordinated connection based attack initiated by malicious agents at multiple clients.

The gateway based malicious communication identify may prevent attacks from client that do not have endpoint module 208A installed thereon.

FIG. 1B may be implemented, for example, within individual clients connecting from outside of a network. The individual client trying to access external servers over the network is blocked at the client itself.

Optionally, an architecture combining FIGS. 1A and 1B is implemented, in which maliciously related network connections may be blocked at both (or either one) the gateway and the client. The double prevention may provide an additional level of security, where malicious code that is able to bypass the prevention at the client level is blocked at the gateway level.

At 102, a connection establishment attempt is identified, as described with reference to FIG. 1A.

At 104, stack data and optional other flow-data (as in block 106) are collected, as described with reference to FIG. 1A.

Optionally, at 130, the connection establishment process is halted at the client, for example, by module 208A. The connection establishment process is halted as an additional security measure to prevent establishment of network connection for malicious activity. Halting the connection establishment process provides time for the gateway to perform the analysis to determine when the connection establishment attempt is associated with malicious activity.

The connection establishment process may be halted by storing the messages related to the connection establishment and preventing the message from being transmitted to the network.

At 108, the collected flow-data is transmitted to the gateway, as described with reference to FIG. 1A.

At 110, the gateway receives the transmitted flow-data, as described with reference to FIG. 1A.

At 112, the gateway analyzes the received flow-data to determine the presence or absence of malicious activity associated with the connection establishment attempt, as described with reference to FIG. 1A.

Optionally, at 132, when the malicious activity is identified, an event is generated, for example, as a network message. The network message is transmitted to the respective client.

Optionally, at 134, upon receiving the network message from the gateway, the client blocks and/or prevents the connection establishment process. The network connection may be blocked and/or prevented from activation.

Termination may be performed at the client by endpoint module 208A upon receiving messages from gateway 210 indicating the detection of the malicious attempt at network connection establishment, for example, by issuing messages to prevent the programming interface from performing the connection establishment.

Alternatively, at 136, when the absence of malicious activity is identified, a message is transmitted to the client.

Optionally, at 138, the connection establishment process is allowed to continue, and/or the network connection is activated when the message is received that indicates that the network connection is not associated with malicious activity.

Figure 4:
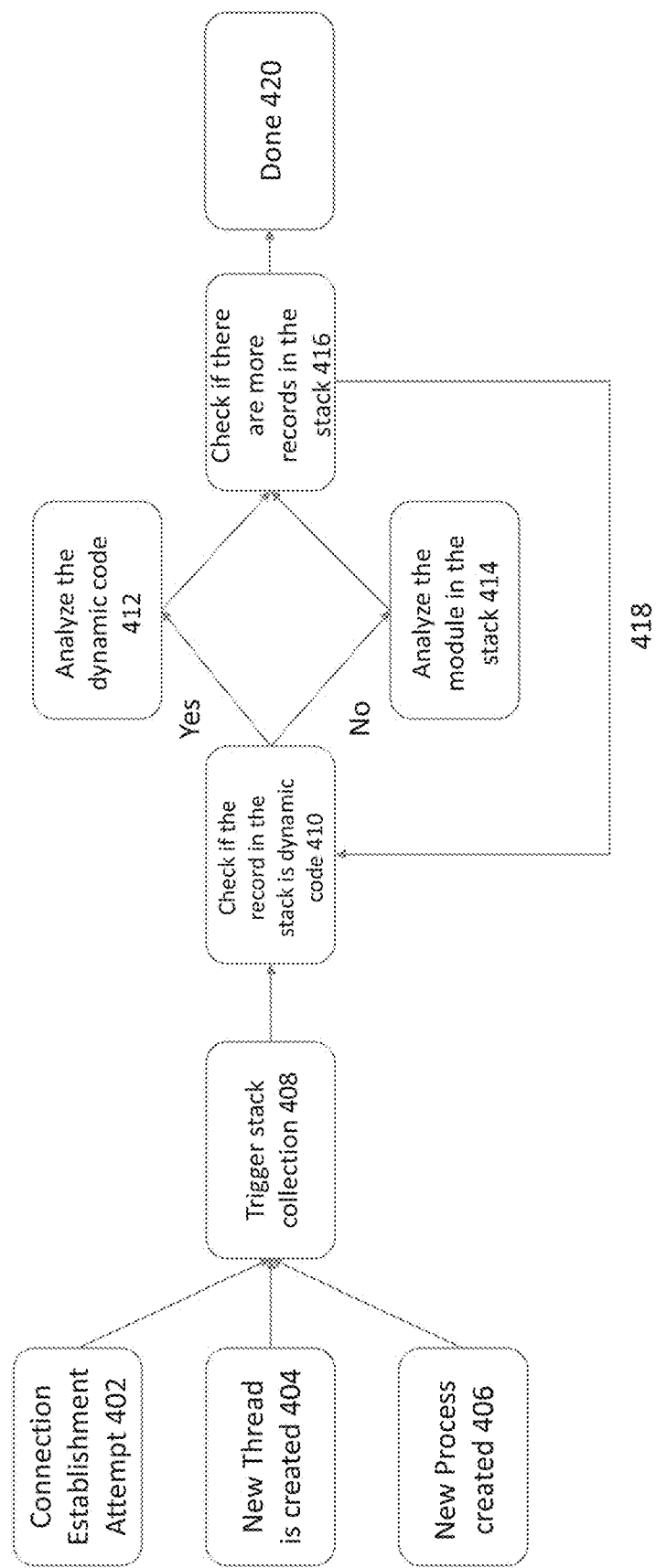
FIG. 4 is a flowchart of a computerized method for collecting stack data, in accordance with some embodiments of the present invention.

Reference is now made to FIG. 4, which is a flowchart of a computerized method for collecting stack data, in accordance with some embodiments of the present invention. The method may be performed by endpoint module 208A installed on client 202.

Optionally, at 402, connection establishment is detected, for example, as described with reference to block 102 of FIG. 1A.

Alternatively or additionally, at 404, the creation of a new thread is identified, for example, based on monitoring of the stack for behavior indicative of the new thread.

Alternatively or additionally at 406, the creation of a new process is identified, for example, based on monitoring of the stack for behavior indicative of the new process.

Optionally, at 408, stack data 208B collection is triggered. The detection of one or more blocks 402, 404, and/or 406 triggers the stack data collection.

At 410, the record in the stack associated with triggering the stack data collection is analyzed to identify the presence of dynamic code within the stack. As described herein, the term dynamic code means code that is executable and does not correspond and/or relate to an existing file stored on an operation system drive, for example, a hard drive, disk on key, on a non-volatile external storage, and on a remote server. The dynamic code only exists in the memory during run time, and does not have equivalent code on the permanent memory (e.g., hard disk). The dynamic code is suggesting of the presence of malicious code.

Optionally, at 412, the dynamic code is analyzed for the presence of malicious code.

At 414, the module(s) in the stack are analyzed.

At 416, a check is performed to determine the presence or absence of additional records in the stack. Optionally, at 418, when additional record(s) are present, the additional records are analyzed by repeating block 410. Alternatively, at 420, the stack data collection is complete when there are no more records.

Figure 5A:
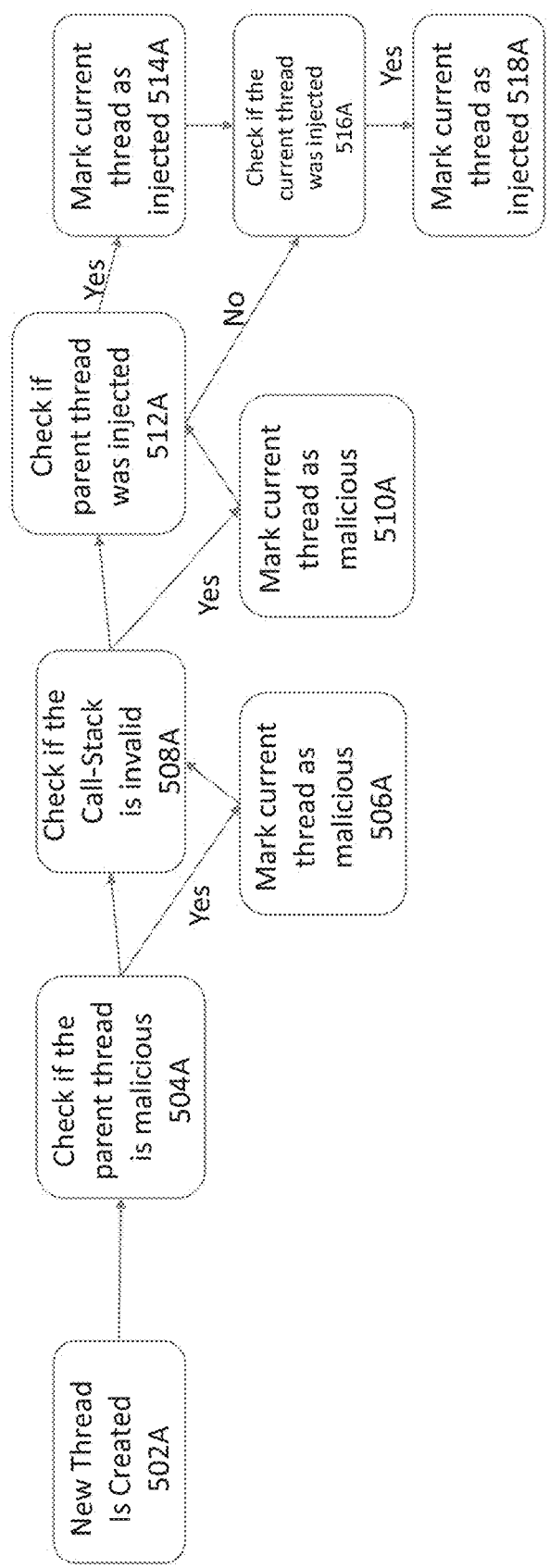
FIG. 5A is a flowchart of a computerized method for collecting thread related flow-data, in accordance with some embodiments of the present invention.

Reference is now made to FIG. 5A, which is a flowchart of a computerized method for collecting thread related flow-data, in accordance with some embodiments of the present invention. The method may be performed by endpoint module 208A installed on client 202.

At 502A, the creation of a new thread is identified for example, based on monitoring the operating system for creation of new threads.

At 504A, the parent thread of the new thread is analyzed to determine when the parent thread is associated with malicious activity. Analysis of the parent thread is performed, for example, as described with reference to block 112 of FIG. 1A.

Optionally, at 506A, when the parent thread is determined to be malicious, the current thread is marked as malicious. Alternatively or additionally, at 508A, the call stack is checked to determine whether the call stack is valid or invalid, for example, for the presence of dynamic code, and/or as described with reference to block 112 of FIG. 1A.

Optionally, at 510A, the current thread is marked as malicious when the call stack is invalid. Alternatively or additionally, at 512A, the parent thread is analyzed to determine when the parent thread has injected the thread into the process. The injected thread may be detected based on the process of the threads. For example, when the process of the parent thread is different than the process of the current thread, the current thread is considered an injection.

Optionally, at 514A, when the parent thread is identified as injected thread, the current thread is marked as injected thread. The injected thread suggests malicious code. Alternatively or additionally, at 516A, the current thread is analyzed to determine when the current thread is injected thread. Optionally, at 518A, the current thread is marked as injected code when the analysis identifies the current thread as injected thread.

Figure 5B:
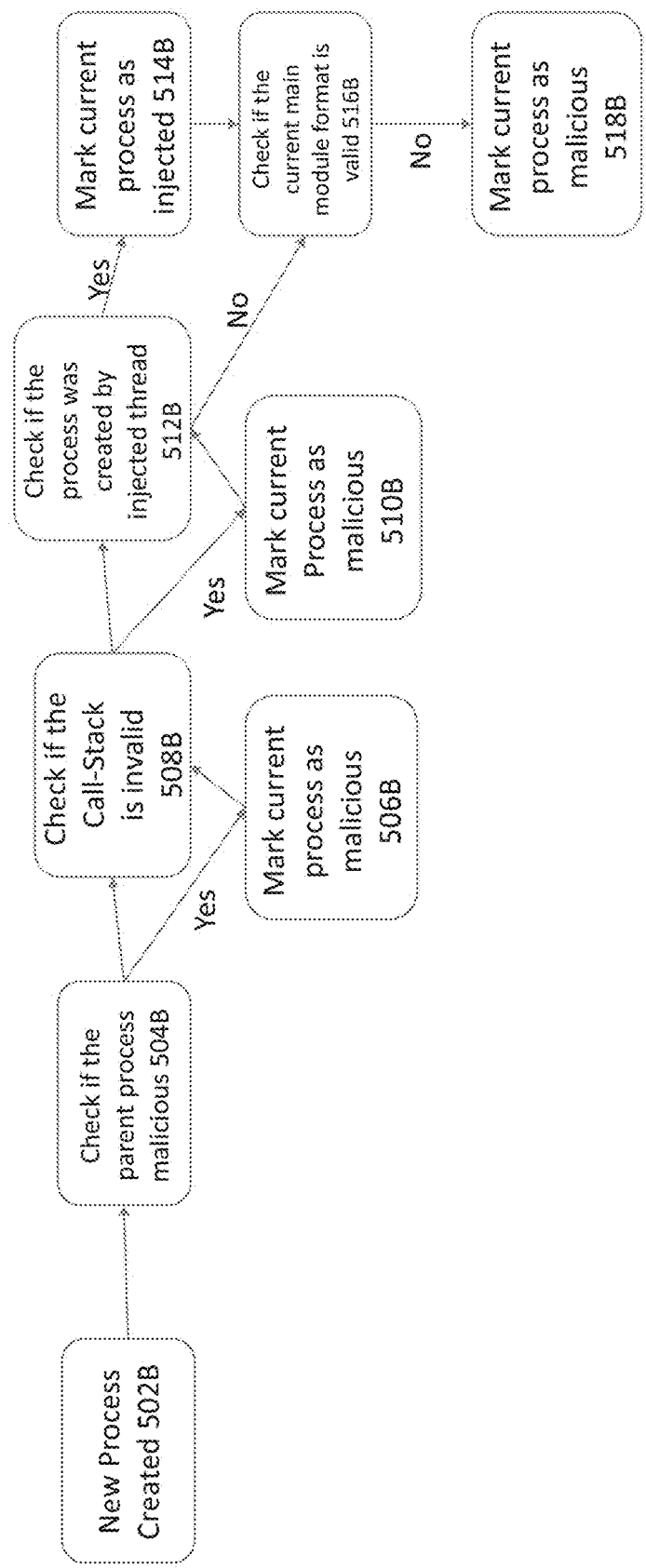
FIG. 5B is a flowchart of a computerized method for collecting process related flow-data, in accordance with some embodiments of the present invention.

Reference is now made to FIG. 5B, which is a flowchart of a computerized method for collecting process related flow-data, in accordance with some embodiments of the present invention. The method may be performed by endpoint module 208A installed on client 202.

Blocks 502B-518B correspond to blocks 502A-518A of FIG. 5A, with reference to a process instead of the thread of FIG. 5A. Of note: in block 512B, an analysis is performed to determine when the process was created by injected thread. In block 516B the current main module format is analyzed to identify whether the module format is valid or invalid. At 518B, the current process is marked as malicious when the process executable format is identified as invalid.

Figure 5C:
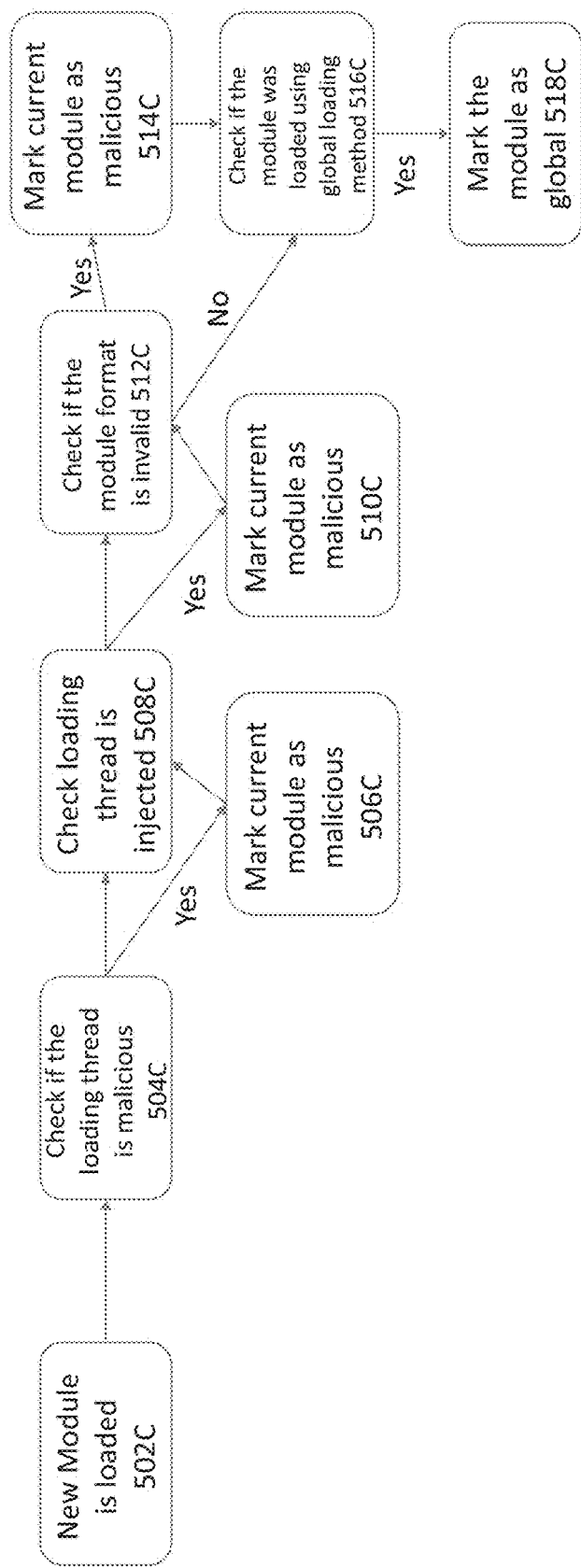
FIG. 5C is a flowchart of a computerized method for collecting module related flow-data, in accordance with some embodiments of the present invention.

Reference is now made to FIG. 5C, which is a flowchart of a computerized method for collecting module related flow-data, in accordance with some embodiments of the present invention. The method may be performed by endpoint module 208A installed on client 202.

At 508C an analysis is performed to determine when a new module has been loaded into the process.

At 504C, the loading thread of the new module is analyzed to determine when the loading thread is associated with malicious activity. Analysis of the loading thread is performed, for example, as described with reference to block 112 of FIG. 1A.

Optionally, at 506C, when the loading thread is determined to be malicious, the current module is marked as malicious. Alternatively or additionally, at 508C, an analysis is performed to determine when the loading thread has been injected, for example, based on the analysis performed in FIG. 5A.

Optionally, at 510C, the current module is marked as malicious when the loading thread is injected. Alternatively or additionally, at 512C, the module format is analyzed to determine when the module format is valid or invalid, for example, a portable executable code contains a field in the header that is invalid, for example, an entry point field points to a location outside of the code.

Optionally, at 514C, when the module format is determined to be invalid, the current module is marked as malicious. Alternatively or additionally, at 516C, an analysis is performed to determine when the module was loaded using a global loading method. As described herein, the term global loading method means a module that loads for different processes, which may be unrelated to each other. A globally loaded module suggests malicious activity.

Optionally, at 518C, the current module is marked as global when the analysis identifies the current module as a globally loaded module.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant malicious agents, clients, networks, stacks, and servers will be developed and the scope of the terms malicious agents, clients, networks, stacks, and servers is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for client-side detection and prevention of an attempt at establishment of a network connection for malicious communication, comprising:

detecting, by endpoint code executing on a client terminal, a connection establishment process for establishing a network connection from the client terminal to a server, the connection establishment process initiated by code running on the client terminal;

analyzing, by a network gateway in communication with the client terminal and in network communication with the server, records in at least one stack trace of the initiating code managed at the client terminal, prior to establishment of the network connection and prior to data communication from the client terminal to the server, to detect a trial to establish a malicious communication wherein the network connection is used for malicious activity; and establishing, by the network gateway, the network connection for data communication from the client to the server when the analysis does not detect the trial to establish the malicious communication based on the network connection, and blocking, by the network gateway, establishment of the network connection for data communication from the client to the server when the analysis detects the trial to establish the malicious communication based on the network connection.

2. The method of claim 1, wherein analyzing records comprises analyzing flow-data including the at least one stack trace and at least one member of the group consisting of: thread data, module data, and process data related to the connection establishment.

3. The method of claim 1, further comprising:
gathering, at each respective client, data related to the at least one stack trace and/or flow-data; and
transmitting, from each respective client to a central server, the data related to the at least one stack trace;
wherein the analyzing is performed by the central server.

4. The method of claim 3, wherein data related to the at least one stack trace includes dynamic code.

5. The method of claim 1, further comprising permitting the connection establishment process to activate the network connection when the trial to establish the malicious communication based on the network connection is not detected.

6. The method of claim 1, wherein the analyzing is performed prior to activation of the network connection.

7. The method of claim 1, wherein the analysis is performed prior to malicious activity and/or communication related data forwarding by the initiating application when the network connection is activated.

8. The method of claim 1, wherein the at least one stack trace is collected during the connection establishment executed according to a transmission control protocol (TCP) of the internet protocol suite for initiation of the connection establishment process.

9. The method of claim 1, further comprising halting the connection establishment process after the detecting.

10. The method of claim 1, wherein the at least one stack trace and/or flow-data is obtained at the initiation of the connection establishment process.

11. The method of claim 1, wherein the at least one stack trace includes at least one sequence of multiple stack traces obtained at multiple points during the connection establishment process, and said analyzing comprises matching the multiple stack traces to flow-data analysis representing the trial to establish the malicious communication.

12. The method of claim 1, wherein analyzing comprises analyzing the records of the at least one stack trace for at least one of an unknown module and a blacklisted or whitelisted module, representing infection of the initiating application.

13. The method of claim 1, wherein analyzing comprises analyzing the at least one stack trace for connection establishment flow-data analysis used by uninfected applications designated as valid at a central server performing the analysis.

14. The method of claim 1, wherein analyzing comprises comparison of at least one stack trace with connection establishment stack flow-data analysis expected to be generated by the application when the application has not been infected with injected code that initiates the trial to establish the malicious activity/communication.

15. A system for client-side detection of an attempt at establishment of a network connection for malicious communication, comprising:
at least one network gateway in communication with a client terminal and in network communication with a server, configured to:
receive at least one stack trace of a code running on the client terminal during a connection establishment process for establishing a network connection from the client terminal to the network based server, wherein the connection establishment process is detected by endpoint code executing on the client terminal, wherein the connection establishment process is initiated by code running on the client terminal;
analyze records in the at least one stack trace, prior to establishment of the network connection and prior to data communication from the client terminal to the server, to determine a presence or absence of a trial to establish a malicious communication wherein the network connection is used for malicious activity;
detect an attempt at establishing the network connection for the malicious communication when the records are matched to malicious flow-data analysis; and
establish the network connection for data communication from the client to the server when the records are not matched to malicious flow-data analysis, and generate a signal representing the trial to establish the malicious communication using the network connection for data communication from the client to the server.

16. The system of claim 15, wherein receive comprises receive at least one flow-data and analyze records comprises analyze the flow-data including the at least one stack trace and at least one member of the group consisting of: thread data, module data, and process data related to the connection establishment.

17. The system of claim 15, wherein the at least one gateway resides at a remote server communicating with the client terminal over a network.

18. The system of claim 15, wherein the at least one gateway is a software module residing at the client terminal.

19. The system of claim 15, wherein the at least one gateway is a proxy server.

20. The system of claim 15, further comprising:
the endpoint module for installation at the client terminal, configured to:
detect an initiation of establishment of the network connection by the code;
transmit the at least one stack trace and/or flow-data to the gateway;
receive the signal from the gateway; and
block the connection establishment process to prevent activation of the network connection based on the received signal.

21. The system of claim 15, wherein the at least one gateway is further configured to prevent activation of the network connection based on the received signal.

22. The system of claim 15, further comprising:
a management server in communication with the at least one gateway, the management server configured to collect the signal generated by the at least one gateway for each network connection request related to each client.

23. The system of claim 22, wherein the management server further includes a user interface configured to allow a user to perform at least one member of the group consisting of: review the generated signals, manage the generated signals, centrally control the configuration of the at least one gateway, centrally control the configuration of at least one client terminal communicating with the at least one gateway, monitor status of the at least one gateway, and monitor status of at least one client terminal communicating with the at least one gateway.

24. The system of claim 15, wherein the application running on the client terminal is a web browser.

25. The system of claim 15, wherein the connection establishment process is managed by an application programming interface that represents a local end point for the network connection.

26. The system of claim 15, wherein the application running on the client terminal is part of a hypervisor.

27. The system of claim 15, wherein the application running on the client terminal is an unauthorized malicious application.

28. The system of claim 15, further comprising updating the at least one gateway with a stack flow-data analysis associated with the identified attempt at establishing the network connection for the malicious communication, to identify similar stack flow-data analysis from other client terminals.

29. The system of claim 15, wherein the at least one gateway is further configured to:
receive at least one stack trace of the application when the network connection is active; and
analyze records in the at least one stack trace to monitor for post connection establishment malicious activity using the active network connection.

30. The system of claim 15, wherein the at least one gateway is further configured to:
receive a plurality of at least one flow-data from each of a plurality of clients; and
analyze the plurality of at least one flow-data to detect a coordinated attack.

31. A computer program product for execution by at least one hardware processor of a network gateway in communication with a client terminal and in network communication with a server, for client-side detection of an attempt at establishment of a network connection for malicious activity, the computer program product comprising:
at least one non-transitory computer-readable storage medium, and program instructions stored on at least one of the at least one storage mediums, the program instructions comprising:
program instructions for receiving an indication of a detection, by endpoint code executing on the client terminal, of a connection establishment process for establishing a network connection from the client terminal to the server, the connection establishment process initiated by code running on the client terminal;
program instructions for analyzing records in at least one stack trace of the initiating code managed at the client terminal, prior to establishment of the network connection and prior to data communication from the client terminal to the server, to detect a trial to establish a malicious communication wherein the network connection is used for malicious activity; and
program instructions for establishing the network connection for data communication from the client to the server when the analysis does not detect the trial to establish the malicious communication based on the network connection, and blocking establishment of the network connection for data communication from the client to the server when the analysis detects the trial to establish the malicious communication based on the network connection.

* * * * *